(12) United States Patent
Chen et al.

(10) Patent No.: US 11,537,852 B2
(45) Date of Patent: Dec. 27, 2022

(54) EVOLVING GRAPH CONVOLUTIONAL NETWORKS FOR DYNAMIC GRAPHS

(71) Applicants: International Business Machines Corporation, Armonk, NY (US); Massachusetts Institute of Technology, Cambridge, MA (US)

(72) Inventors: Jie Chen, Briarcliff Manor, NY (US); Aldo Pareja, Cambridge, MA (US); Giacomo Domeniconi, White Plains, NY (US); Tengfei Ma, White Plains, NY (US); Toyotaro Suzumura, New York, NY (US); Timothy Kaler, Cambridge, MA (US); Tao B. Schardl, Cambridge, MA (US); Charles E. Leiserson, Cambridge, MA (US)

(73) Assignees: International Business Machines Corporation, Armonk, NY (US); Massachusetts Institute of Technology, Cambridge, MA (US)

( * ) Notice: Subject to any disclaimer, the term of this patent is extended or adjusted under 35 U.S.C. 154(b) by 396 days.

(21) Appl. No.: 16/790,682

(22) Filed: Feb. 13, 2020

(65) Prior Publication Data
US 2021/0256355 A1  Aug. 19, 2021

(51) Int. Cl.
*G06N 3/04* (2006.01)
*G06K 9/62* (2022.01)
(Continued)

(52) U.S. Cl.
CPC .......... *G06N 3/0472* (2013.01); *G06F 17/16* (2013.01); *G06K 9/6267* (2013.01); *G06N 3/08* (2013.01);
(Continued)

(58) Field of Classification Search
CPC ........ G06N 5/022; G06N 3/08; G06N 3/0454; G06N 3/04; G06N 3/0445; G06N 20/00;
(Continued)

(56) References Cited

U.S. PATENT DOCUMENTS 10,776,714 B2 * 9/2020 Herreshoff ............. G06N 20/00
10,956,500 B2 * 3/2021 Brevdo ................ G06N 3/0445
(Continued)

FOREIGN PATENT DOCUMENTS

CN   109522793 A * 10/2018 ............... G06K 9/00
CN   110188599 A *  8/2019 ............... G06K 9/00
(Continued)

OTHER PUBLICATIONS

Narayan et al. Learning graph dynamics using deep neural networks, IFAC-PapersOnLine, 51(2):433-438, 2018.
(Continued)

*Primary Examiner* — Andrew Joseph Rudy
(74) *Attorney, Agent, or Firm* — Anthony Curro; Otterstedt & Kammer PLLC

(57) ABSTRACT

A system includes a plurality of graph convolutional networks corresponding to a plurality of time steps, each network modelling a graph including nodes and edges, and in turn including a plurality of graph convolution units; an evolving mechanism; and an output layer. Each of the units, for a given one of the time steps, takes as input a graph adjacency matrix, a node feature matrix, and a parameter matrix for a current layer, and outputs a new node feature matrix for a next highest layer. The mechanism takes as input a parameter matrix for a prior time step updates the input parameter matrix, and outputs the parameter matrix for the given time step. The output layer obtains, as input, output
(Continued)

of each of the units for a final time step, and based on the output of each of the units for the final time step, outputs a graph solution.

20 Claims, 11 Drawing Sheets

(51) Int. Cl.
G06N 3/08 (2006.01)
G06F 17/16 (2006.01)
G06N 20/00 (2019.01)
H04L 9/40 (2022.01)
G06Q 30/02 (2012.01)
G06Q 20/40 (2012.01)

(52) U.S. Cl.
CPC .......... *G06N 20/00* (2019.01); *G06Q 20/4016* (2013.01); *G06Q 30/0201* (2013.01); *H04L 63/1425* (2013.01)

(58) Field of Classification Search
CPC .............. G06N 3/0472; H04L 63/1425; G06Q 20/4016; G06Q 30/021; G06K 9/6267; G06K 9/62; G06F 17/16
USPC ...................... 706/12, 15, 20, 26, 27; 705/15
See application file for complete search history.

(56) References Cited

U.S. PATENT DOCUMENTS

| | | | | |
|---|---|---|---|---|
| 11,010,658 | B2* | 5/2021 | Koren | G06N 3/0454 |
| 11,386,507 | B2* | 7/2022 | Horesh | G06Q 50/01 |
| 2018/0129967 | A1 | 5/2018 | Herreshoff | |
| 2018/0204117 | A1 | 7/2018 | Brevdo | |
| 2019/0042911 | A1 | 2/2019 | Koren et al. | |
| 2019/0042935 | A1 | 2/2019 | Deisher | |
| 2019/0122111 | A1 | 4/2019 | Min et al. | |
| 2020/0043467 | A1* | 2/2020 | Qian | G06N 3/0445 |
| 2020/0394499 | A1* | 12/2020 | Yao | G06N 3/0454 |
| 2021/0232810 | A1* | 7/2021 | Parsa | G06V 10/764 |

FOREIGN PATENT DOCUMENTS

| | | | | |
|---|---|---|---|---|
| CN | 110298278 | A * | 10/2019 | G06K 9/00 |
| EP | 3462385 | A1 | 4/2019 | |

OTHER PUBLICATIONS

Yu et al., Spatio-temporal graph convolutional networks: A deep learning framework for traffic forecasting, In IJCAI, 2018, 7 pages.
Seo et al., Structured sequence modeling with graph convolutional recurrent networks, ArXiv preprint arXiv:1612.07659, 2016, 10 pages.
Manessi et al., Dynamic graph convolutional networks, ArXiv preprint arXiv:1704.06199, 2017, 16 pages.
Pareja et al., "EvolveGCN: Evolving Graph Convolutional Networks for Dynamic Graphs", Feb. 26, 2019, 8 pages, https://arxiv.org/pdf/1902.10191v1.pdf.
Pareja et al., "EvolveGCN: Evolving Graph Convolutional Networks for Dynamic Graphs", Sep. 8, 2019, 8 pages, https://arxiv.org/pdf/1902.10191v2.pdf.
Pareja et al., "EvolveGCN: Evolving Graph Convolutional Networks for Dynamic Graphs", Nov. 18, 2019, 9 pages, https://arxiv.org/pdf/1902.10191v2.pdf.
Pareja et al., "EvolveGCN: Evolving Graph Convolutional Networks for Dynamic Graphs", Nov. 18, 2019, 9 pages, https://jie-chen-ibm.appspot.com/pub/evolvgcn.pdf.
Domeniconi et al., "GitHub—IBM/EvolveGCN: Code for EvolveGCN: Evolving Graph Convolutional Networks for Dynamic Graphs", Nov. 18, 2019, 3 pages, https://github.com/IBM/EvolveGCN.
Perozzi et al., DeepWalk: Online learning of social representations, In KDD, 2014, 35 pages.
Tang et al., Line: Large-scale information network embedding, Proceedings of the 24th international conference on world wide web, pp. 1067-1077, 2015.
Cao et al., Grarep: Learning graph representations with global structural information, Proceedings of the 24th ACM international on conference on information and knowledge management, pp. 891-900, 2015.
Ou et al., Asymmetric transitivity preserving graph embedding, Proceedings of the 22nd ACM SIGKDD international conference on Knowledge discovery and data mining, pp. 1105-1114, 2016.
Grover et al., node2vec: Scalable feature learning for networks, Proceedings of the 22nd ACM SIGKDD international conference on Knowledge discovery and data mining, pp. 855-864, 2016.
Bruna et al., Spectral networks and locally connected networks on graphs, arXiv preprint arXiv:1312.6203 (2013), 14 pages.
Duvenaud et al., Convolutional networks on graphs for learning molecular fingerprints, Advances in neural information processing systems, pp. 2224-2232, 2015.
Defferrard et al., Convolutional neural networks on graphs with fast localized spectral filtering, Advances in neural information processing systems, pp. 3844-3852, 2016.
Li et al., Gated graph sequence neural networks, arXiv preprint arXiv:1511.05493 (2015), 20 pages.
Gilmer et al., Neural message passing for quantum chemistry, Proceedings of the 34th International Conference on Machine Learning, vol. 70, pp. 1263-1272, JMLR. org, 2017.
Kipf et al., Semi-supervised classification with graph convolutional networks, arXiv preprint arXiv:1609.02907 (2016), 14 pages.
Hamilton et al., Inductive representation learning on large graphs, Advances in Neural Information Processing Systems, pp. 1024-1034, 2017.
Jin et al., Predicting organic reaction outcomes with Weisfeiler-Lehman network, Advances in Neural Information Processing Systems, pp. 2607-2616, 2017.
Chen et al., Fastgcn: fast learning with graph convolutional networks via importance sampling, arXiv preprint arXiv:1801.10247, (2018), 15 pages.
Veličković et al., Graph attention networks, arXiv preprint arXiv:1710.10903 (2017), 12 pages.
Seo et al., Structured sequence modeling with graph convolutional recurrent networks, International Conference on Neural Information Processing, pp. 362-373, Springer, Cham, 2018 arXiv:1612.07659, 2016.
Manessi et al., Dynamic graph convolutional networks, Pattern Recognition 97 (2020): 107000, arXiv:1704.06199, 2017, 16 pages.
Narayan et al., Learning graph dynamics using deep neural networks, IFAC-PapersOnLine 51, No. 2 (2018): 433-438.
Yu et al., Spatio-temporal graph convolutional networks: A deep learning framework for traffic forecasting, arXiv preprint arXiv:1709.04875 (2017), 7 pages.
Peter Mell Timothy Grance, The NIST Definition of Cloud Computing. National Institute of Standards and Technology, Sep. 2011. pp. 7.

\* cited by examiner

1: Function $[H_t^{(l+1)}, W_t^{(l)}] = \text{EGCU-H}(A_t, H_t^{(l)}, W_{t-1}^{(l)})$ 2: $\quad W_t^{(l)} = \text{GRU}(H_t^{(l)}, W_{t-1}^{(l)})$ 3: $\quad H_t^{(l+1)} = \text{GCONV}(A_t, H_t^{(l)}, W_t^{(l)})$ 4: End function

1: Function $[H_t^{(l+1)}, W_t^{(l)}] = \text{EGCU-O}(A_t, H_t^{(l)}, W_{t-1}^{(l)})$ 2: $\quad W_t^{(l)} = \text{LSTM}(W_{t-1}^{(l)})$ 3: $\quad H_t^{(l+1)} = \text{GCONV}(A_t, H_t^{(l)}, W_t^{(l)})$ 4: End function

FIG. 5

1: Function $H_t = g(X_t, H_{t-1})$
2: $\quad Z_t = \text{Sigmoid}(W_Z X_t + U_Z H_{t-1} + B_Z)$
3: $\quad R_t = \text{Sigmoid}(W_R X_t + U_R H_{t-1} + B_R)$
4: $\quad \tilde{H}_t = \text{Tanh}(W_H X_t + U_H(R_t \circ H_{t-1}) + B_H)$
5: $\quad H_t = (1 - Z_t) \circ H_{t-1} + Z_t \circ \tilde{H}_t$
6: End Function

FIG. 6

1: Function $Z_t = \text{Summarize}(X_t, k)$
2: $\quad y_t = X_t p / \|p\|$
3: $\quad i_t = \text{Top-Indices}(y_t, k)$
4: $\quad Z_t = [X_t \circ \text{Tanh}(y_t)]_{i_t}$
5: End Function

FIG. 7

1: Function $H_t = f(X_t)$

2:     Current Input $X_t$ is the Same as the Past Output $H_{t-1}$

3:     $F_t = \text{Sigmoid}(W_F X_t + U_f H_{t-1} + B_F)$

4:     $I_t = \text{Sigmoid}(W_I X_t + U_I H_{t-1} + B_I)$

5:     $O_t = \text{Sigmoid}(W_O X_t + U_O H_{t-1} + B_O)$

6:     $\tilde{C}_t = \text{Tanh}(W_C X_t + U_C H_{t-1} + B_C)$

7:     $C_t = F_t \circ C_{t-1} + I_t \circ \tilde{C}_t$

8:     $H_t = O_t \circ \text{Tanh}(C_t)$

9: End Function

FIG. 8

Data Sets

| | # Nodes | # Edges | # Time Steps (Train / Val/Test) |
|---|---|---|---|
| SBM | 1,000 | 4,870,863 | 35 / 5 / 10 |
| BC-OTC | 5,881 | 35,588 | 95 / 14 / 28 |
| BC-Alpha | 3,777 | 24,173 | 95 / 13 / 28 |
| UCI | 1,899 | 59,835 | 62 / 9 / 17 |
| AS | 6,474 | 13,895 | 70 / 10 / 20 |
| Reddit | 55,863 | 858,490 | 122 / 18 / 34 |
| Elliptic | 203,769 | 234,355 | 31 / 5 / 13 |

FIG. 9

Performance of Link Prediction—Each Column is One Data Set

| | Mean Average Precision | | | | | | Mean Reciprocal Rank | | | | | |
|---|---|---|---|---|---|---|---|---|---|---|---|---|
| | SBM | BC-OTC | BC-Alpha | UCI | AS | | SBM | BC-OTC | BC-Alpha | UCI | AS | |
| GCN | 0.1987 | 0.0003 | 0.0003 | 0.0251 | 0.0003 | | 0.0138 | 0.0025 | 0.0031 | 0.1141 | 0.0555 | |
| GCN-GRU | 0.1898 | 0.0001 | 0.0001 | 0.0114 | 0.0713 | | 0.0119 | 0.0003 | 0.0004 | 0.0985 | 0.3388 | |
| DynGEM | 0.1680 | 0.0134 | 0.0525 | 0.0209 | 0.0529 | | 0.0139 | 0.0921 | 0.1287 | 0.1055 | 0.1028 | |
| Dyngraph2vecAE | 0.0983 | 0.0090 | 0.0507 | 0.0044 | 0.0331 | | 0.0079 | 0.0916 | 0.1478 | 0.0540 | 0.0698 | |
| Dyngraph2vecAERNN | 0.1593 | 0.0220 | 0.1100 | 0.0205 | 0.0711 | | 0.0120 | 0.1268 | 0.1945 | 0.0713 | 0.0493 | |
| EvolveGCN-H | 0.1947 | 0.0026 | 0.0049 | 0.0126 | 0.1534 | | 0.0141 | 0.0690 | 0.1104 | 0.0899 | 0.3632 | |
| EvolveGCN-O | 0.1989 | 0.0028 | 0.0036 | 0.0270 | 0.1139 | | 0.0138 | 0.0968 | 0.1185 | 0.1379 | 0.2746 | |

FIG. 10

EVOLVING GRAPH CONVOLUTIONAL NETWORKS FOR DYNAMIC GRAPHS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S):

Pareja A, Domeniconi G, Chen J, Ma T, Suzumura T, Kanezashi H, Kaler T, Leisersen CE. EvolveGCN: Evolving graph convolutional networks for dynamic graphs. arXiv preprint arXiv:1902.10191. 2019 Feb. 26.

Aldo Pareja, Giacomo Domeniconi, Jie Chen, Tengfei Ma, Toyotaro Suzumura, Hiroki Kanezashi, Tim Kaler, Tao B. Schardl, Charles E. Leiserson. EvolveGCN: Evolving graph convolutional networks for dynamic graphs. arXiv preprint arXiv:1902.10191v2 8 Sep. 2019.

Aldo Pareja, Giacomo Domeniconi, Jie Chen, Tengfei Ma, Toyotaro Suzumura, Hiroki Kanezashi, Tim Kaler, Tao B. Schardl, Charles E. Leiserson. EvolveGCN: Evolving graph convolutional networks for dynamic graphs. arXiv preprint arXiv:1902.10191v3 18 Nov. 2019.

Aldo Pareja, Giacomo Domeniconi, Jie Chen, Tengfei Ma, Toyotaro Suzumura, Hiroki Kanezashi, Tim Kaler, Tao B. Schardl, and Charles E. Leiserson, IBM/EvolveGCN, Code for EvolveGCN: Evolving Graph Convolutional Networks for Dynamic Graphs, GitHub, Nov. 18, 2019.

BACKGROUND

The present invention relates to the electrical, electronic, and computer arts, and more specifically, to artificial intelligence (AI), machine learning, machine reasoning, and the like.

Graphs are ubiquitous data structures that encode the pairwise interactions between entities. In real life, often graphs vary over time. At each time step, it is desirable to classify the nodes, edges, and the graphs themselves; and for a future time step, it is desirable to predict the existence of the edges, based on known current and past information.

Existing methods use a constant Graph Convolutional Network (GCN) to achieve these goals. A GCN is a neural network that operates on graphs. Given a graph G=(V, E), a GCN takes as input an input feature and a matrix representation of the graph structure. At each layer, features are aggregated to form the next layer's features using a propagation rule.

SUMMARY

Principles of the invention provide techniques for evolving graph convolutional networks for dynamic graphs. In one aspect, an exemplary machine learning system includes a plurality of graph convolutional networks corresponding to a plurality of time steps, each graph convolutional network modelling a graph including nodes and edges, each graph convolutional network including a plurality of graph convolution units; an evolving mechanism; and an output layer. The plurality of graph convolutional networks, the evolving mechanism, and the output layer are in data communication. Each of the graph convolution units, for a given one of the time steps, takes as input a graph adjacency matrix, a node feature matrix, and a parameter matrix for a current layer, and outputs a new node feature matrix for a next highest layer. The evolving mechanism takes as input a parameter matrix for a time step prior to the given one of the time steps, updates the input parameter matrix, and outputs the parameter matrix for the given one of the time steps. The output layer obtains, as input, output of each of the graph convolution units for a final one of the time steps, and based on the output of each of the graph convolution units for the final one of the time steps, outputs a graph solution output.

In another aspect, an exemplary method includes the step of, for each of a plurality of graph convolutional networks corresponding to a plurality of time steps, each graph convolutional network modelling a graph including nodes and edges, each graph convolutional network including a plurality of graph convolution units, for a given one of the time steps, taking as input a graph adjacency matrix, a node feature matrix, and a parameter matrix for a current layer, and outputting a new node feature matrix for a next highest layer. Further steps include, with an evolving mechanism, taking as input a parameter matrix for a time step prior to the given one of the time steps, updating the input parameter matrix, and outputting the parameter matrix for the given one of the time steps; and obtaining, as input to an output layer in data communication with the evolving mechanism and the plurality of graph convolutional networks, output of each of the graph convolution units for a final one of the time steps, and based on the output of each of the graph convolution units for the final one of the time steps, outputting from the output layer a graph solution output.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

ability to evolves a Graph Convolutional Network over time, as opposed to existing methods that use a constant Graph Convolutional Network that does not change;

ability to handle new graph nodes not present originally, as opposed to existing methods that require the knowledge of the node since the beginning of time;

in a computer network, improved ability to detect attempts at unauthorized intrusions and/or malware.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 presents equations for evolving graph convolution units, according to an aspect of the invention;

FIGS. 6 and 7 present equations corresponding to the approach of FIG. 4A, according to an aspect of the invention;

FIG. 8 presents equations corresponding to the approach of FIG. 4B, according to an aspect of the invention;

FIG. 9 is a table showing data sets used in testing experimental embodiments of the invention;

FIG. 10 is a table showing exemplary experimental results obtained in testing experimental embodiments of the invention;

DETAILED DESCRIPTION

Figure 1:
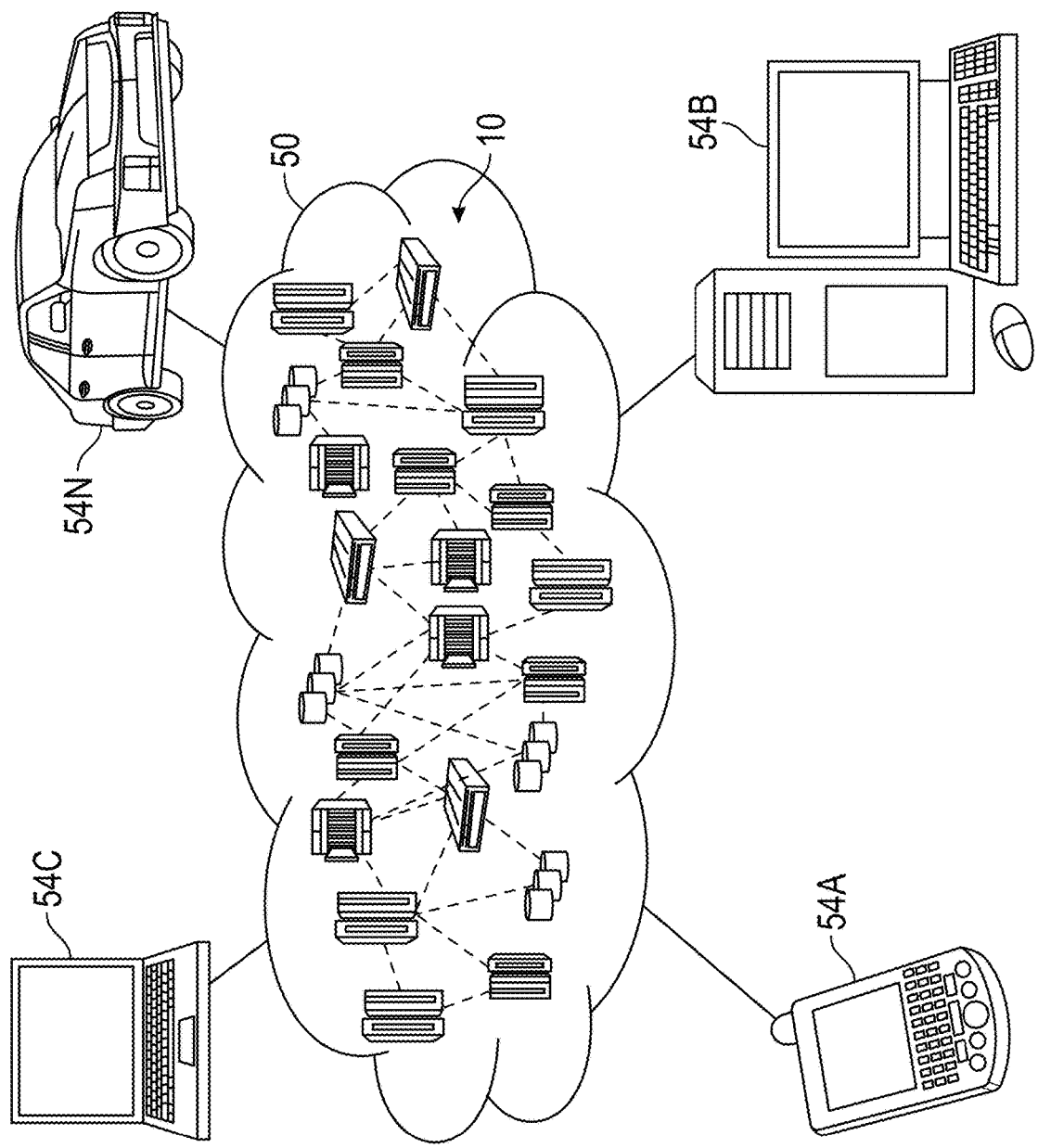
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
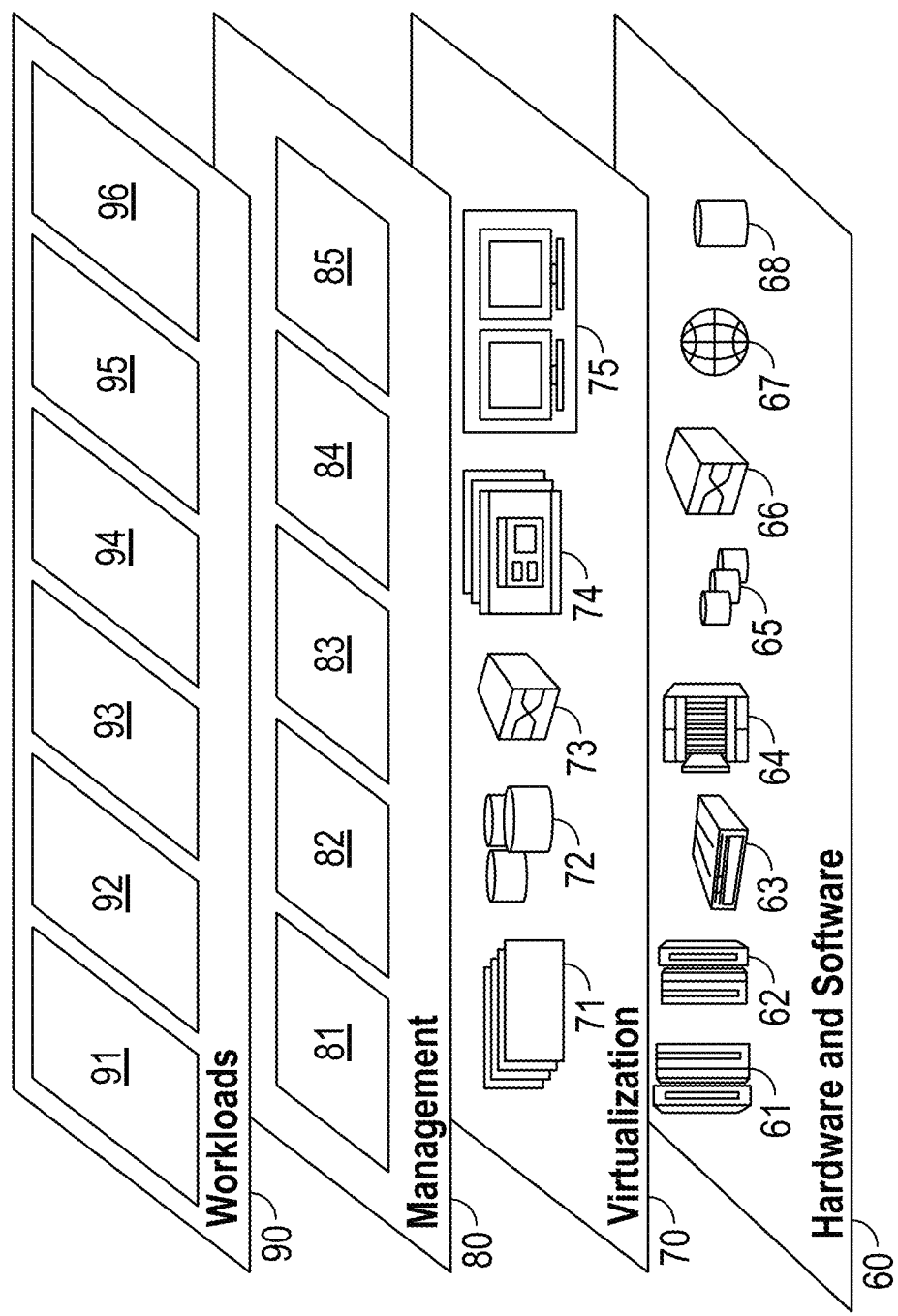
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service for evolving graph convolutional networks for dynamic graphs 96.

As noted, graphs are ubiquitous data structures that encode the pairwise interactions between entities. In real life, often graphs vary over time. At each time step, it is desirable to classify the nodes, edges, and the graphs themselves; and for a future time step, it is desirable to predict the existence of the edges, based on known current and past information. Existing methods use a constant Graph Convolutional Network (GCN) to achieve these goals. However, a constant GCN does not adapt to the dynamism of the graphs. One or more embodiments advantageously evolve the GCN over time so that it carries over the dynamism and performs better classification and prediction. Indeed, one or more embodiments uncover the dynamism of a sequence of temporally varying graphs, classify nodes and edges in these graphs, predict the existence of edges at a future time step, and classify the graphs themselves over time. One or more embodiments evolve the GCN for a graph at each time step.

One or more embodiments evolve a GCN over time, as opposed to existing methods that use a constant GCN that does not change. One or more embodiments can advantageously handle new graph nodes not present originally, as opposed to existing methods that require the knowledge of the node since the beginning of time.

An exemplary embodiment of an evolving GCN is referred to herein as "EvolveGCN"; such an exemplary embodiment includes a Graph Convolutional Network (GCN), which includes several graph convolution units; an evolving mechanism that evolves the parameters of the graph convolution units; and an output layer that carries out node classification, edge classification, graph classification, and link prediction.

A GCN includes several graph convolution (GCONV) units. Each GCONV unit functions at a specific time step t and creates and passes information from layer l to layer l+1. Specifically, a GCONV takes the graph adjacency matrix and the node feature matrix as input, and outputs a new feature matrix for the next layer. A parameter matrix is employed in computing the outputs. For each GCONV, the parameter matrix at time step t−1 is updated for time step t.

The update of the parameter matrix can be carried out in a number of different ways; for example: by using a Gated Recurrent Unit (GRU) or any recurrent neural network, which additionally uses the node feature matrix at time step t and layer l as input; by using a Markov transition matrix; or by using the autoregressive formula.

Figure 4A:
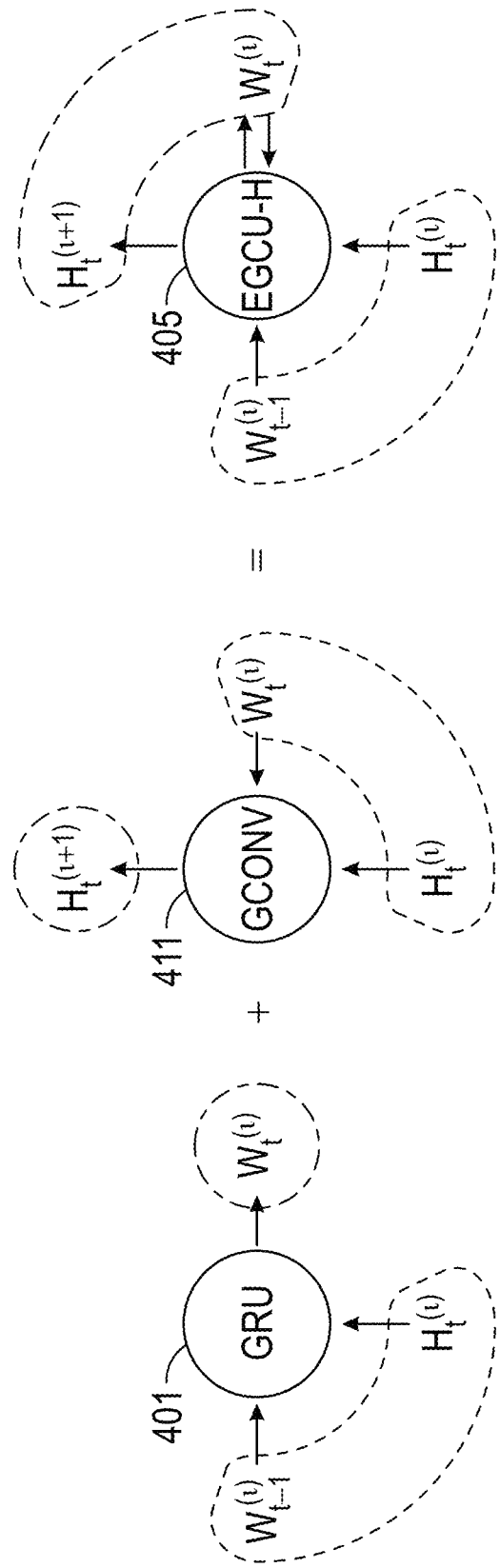
FIGS. 4A and 4B show two possible non-limiting exemplary implementations of the units of the evolving graph convolutional network (GCN), according to aspects of the invention.

FIG. 4A, discussed in greater detail below, illustrates the use of a GRU for updating the parameter W. All the figures, from FIGS. 4A and 4B to FIG. 8, explain two specific, non-limiting, exemplary approaches to updating the parameter matrix.

Different embodiments can solve different tasks. The output layer can vary depending on what task it is desired to solve:

Type 1 output layer: node classification—the layer includes the last GCONV unit, which outputs a probability vector for each graph node at a specific time step. The probability vector indicates whether a node belongs to a certain class.

Type 2 output layer: edge classification—the final layer of the network takes in the feature vectors of the two end nodes of this edge (the output of the last GCONV unit), concatenates the features of the two incident nodes, and applies a multilayer perceptron to output a probability vector for the edge (i.e. probability that an edge exists).

Type 3 output layer: link prediction—layer is the same as that for edge classification, except that it outputs one single probability.

Type 4: graph classification=this layer aggregates all the node features from the last GCONV unit into a single vector; that vector is passed through a multilayer perceptron to output a probability vector for the graph.

Thus, it will be appreciated that embodiments can handle a number of different types of problems by tailoring the design of the final layer.

EvolveGCN with link prediction for the next time step can be used for a number of different applications; for example, forecasting purchases in the future (next time step)—i.e., will a certain person buy a certain thing in the future; for identifying nefarious financial transactions; and the like. For example, for malware detection, this use case can be handled by node classification; for intrusion detection, this use case can be handled by edge classification. In the exemplary application of forensics to financial misconduct, a transaction graph includes customer accounts represented as nodes and transactions between accounts represented as edges. EvolveGCN with node classification is used for identifying accounts associated with misconduct. EvolveGCN with edge classification is used for identifying transactions associated with misconduct. In the exemplary application of a recommendation system, a recommendation graph includes buyers and merchandise as nodes and purchase records as edges. EvolveGCN with link prediction for the next time step is used for forecasting purchases in the future.

One or more embodiments are particularly useful in applications that involve temporally varying graphs (e.g., for financial forensic investigation). One or more embodiments can be implemented, for example, as a cloud-based service with applications in information technology (IT), finance, and the like.

Thus, one or more embodiments change the parameters of a GCN over time.

One or more embodiments have better prediction accuracy than prior art. See FIG. 10, e.g., discussed further below.

It is worth noting at this point that, generally, a neural network includes one or more computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning. In supervised or semi—supervised machine learning the neural network is provided with a set of sample input data and sample output data, and adjusts the connections between the simulated neurons until it can produce the sample output data from the sample input data. Then the neural network is provided with a new set of input data to produce a new set of output data. In unsupervised machine learning, the neural network is provided only with input data, and outputs a categorization of the input data in response to patterns that it identifies in the input data.

Graph representation learning is useful, for example, due to the widespread use of deep learning for Euclidean data, which inspires various creative designs of neural networks in the non-Euclidean domain, particularly graphs. With the success of these graph neural networks (GNN) in the static setting, one or more embodiments advantageously address scenarios where the graph dynamically evolves. Existing approaches typically resort to node embeddings and use a recurrent neural network (RNN, broadly speaking) to regulate the embeddings and learn the temporal dynamics. These methods require the knowledge of a node in the full time span (including both training and testing) and are less applicable to the frequent change of the node set. In some extreme scenarios, the node sets at different time steps may completely differ. To resolve this challenge, one or more embodiments adapt the graph convolutional network (GCN) model along the temporal dimension without resorting to node embeddings. One or more embodiments advantageously capture the dynamism of the graph sequence through using an RNN to evolve the GCN parameters. Two non-limiting exemplary architectures (see FIGS. 4A and 4B) are disclosed for the parameter evolution. Non-limiting exemplary experimental results are presented on tasks including link prediction, edge classification, and node classification. The experimental results indicate a generally higher performance of EvolveGCN compared with prior-art approaches.

Graphs are ubiquitous data structures that model the pairwise interactions between entities. Learning with graphs encounters unique challenges, including their combinatorial nature and the scalability bottleneck, compared with Euclidean data (e.g., images, videos, speech signals, and natural languages). With the remarkable success of deep learning for the latter data types, there exists renewed interest in the learning of graph representations on both the node and the graph level, now parameterized by deep neural networks.

These neural network models generally focus on a given, static graph. In real-life applications, however, often a dynamically evolving graph is encountered. For example, users of a social network develop friendship over time; hence, the vectorial representation of the users should be updated accordingly to reflect the temporal evolution of their social relationships. Similarly, a citation network of scientific articles is constantly enriched due to frequent publications of new work citing prior art. Thus, the influence, and even sometimes the categorization, of an article varies over time. Update of the node embeddings to reflect this variation is advantageously provided in one or more embodiments. In financial networks, transactions naturally come with time stamps. The nature of a user account may change owing to the characteristics of the involved transactions (e.g., an account participates in improper activity or a user becomes a victim of financial impropriety caused by another). Early detection of the change is crucial to the effectiveness of law enforcement and the minimization of loss to a financial institute. One or more embodiments are advantageously able to deal with such issues by providing dynamic graph methods that encode the temporal evolution of relational data.

Graph neural networks (GNN) are currently used for static graphs. One or more embodiments advantageously extend them to the dynamic setting through introducing a recurrent mechanism to update the network parameters, for capturing the dynamism of the graphs. A plethora of GNNs perform information fusion through aggregating node embeddings from one-hop neighborhoods recursively. Each layer of the graph neural network takes node embeddings as input, applies a linear transformation on them, followed by a nonlinear transformation, and outputs the result as new node embeddings. The linear transformation contains parameters. We have found that the graph convolutional network (GCN) provides simplicity and effectiveness. One or more embodiments employ a recurrent neural network (RNN) to inject the dynamism into the parameters of the GCN, which forms an evolving sequence.

One or more embodiments advantageously overcome a limitation of prior art methods which require the knowledge of the nodes over the whole time span; prior art techniques cannot successfully classify the new nodes because of incomplete information which is nonexistent in the past time span. In practice, in addition to the likelihood that new nodes may emerge after training, nodes may also frequently appear and disappear; prior-art node embedding approaches have difficulty handling situations where new nodes emerge after training, and where nodes frequently appear and disappear—it is challenging for RNNs to learn these irregular behaviors. To resolve these challenges, one or more embodiments instead use the RNN to regulate the GCN model (i.e., network parameters) at every time step. This approach effectively performs model adaptation, which focuses on the model itself rather than the node embeddings. Hence, a change of nodes poses no restriction. Further, for future graphs with new nodes without historical information, the evolved GCN is still sensible for them.

Note that in one or more embodiments, the GCN parameters are not trained anymore. They are computed from the RNN and hence only the RNN parameters are trained. In this manner, the number of parameters (model size) does not grow with the number of time steps and the model is as manageable as a typical RNN.

One or more embodiments provide an evolving graph convolutional network that captures the dynamism underlying a graph sequence by using a recurrent model to evolve the GCN parameters. The subscript t is used to denote the time index and superscript/is used to denote the GCN layer index. To avoid notational cluttering, assume that all graphs have n nodes; although it is to be emphasized that the node sets, as well as the cardinality, may change over time. Then, at time step t, the input data includes the pair: ($A_t \in \mathbb{R}^{n \times n}$, $X_t \in \mathbb{R}^{n \times d}$), where the former is the graph (weighted) adjacency matrix and the latter is the matrix of input node features. Specifically, each row of $X_t$ is a d-dimensional feature vector of the corresponding node.

Graph Convolutional Network (GCN): A GCN includes multiple layers of graph convolution, which is similar to a perceptron but additionally has a neighborhood aggregation step motivated by spectral convolution. At time t, the l-th layer takes the adjacency matrix $A_t$ and the node embedding matrix $H_t^{(l)}$ as input, and uses a weight matrix $W_t^{(l)}$ (to update the node embedding matrix to $H_t^{(l+1)}$ as output. Mathematically:

$$H_t^{(l+1)} = GCONV(A_t, H_t^{(l)}, W_t^{(l)}) \quad (1)$$
$$:= \sigma(\hat{A}_t H_t^{(l)} W_t^{(l)}),$$

In the above, $\hat{A}_t$ is a normalization of $A_t$ defined as (omitting the time index for clarity):

$$\hat{A} = \tilde{D}^{-\frac{1}{2}} \tilde{A} \tilde{D}^{-\frac{1}{2}}, \tilde{A} = A + I, \tilde{D} = \text{diag}\left(\sum_j \tilde{A}_{ij}\right)$$

and σ is the is the activation function (typically ReLU) for all but the output layer. The initial embedding matrix comes from the node features; i.e., $H_t^{(0)} = X_t$. Let there be L layers of graph convolutions. For the output layer, the function— may be considered the identity, in which case $H_t^{(L)}$ contains high-level representations of the graph nodes transformed from the initial features; or it may be the softmax for node classification, in which case $H_t^{(L)}$ includes prediction probabilities. As will be appreciated by the skilled artisan, the softmax function takes as input a vector of K real numbers, and normalizes it into a probability distribution including K probabilities proportional to the exponentials of the input numbers.

Figure 3:
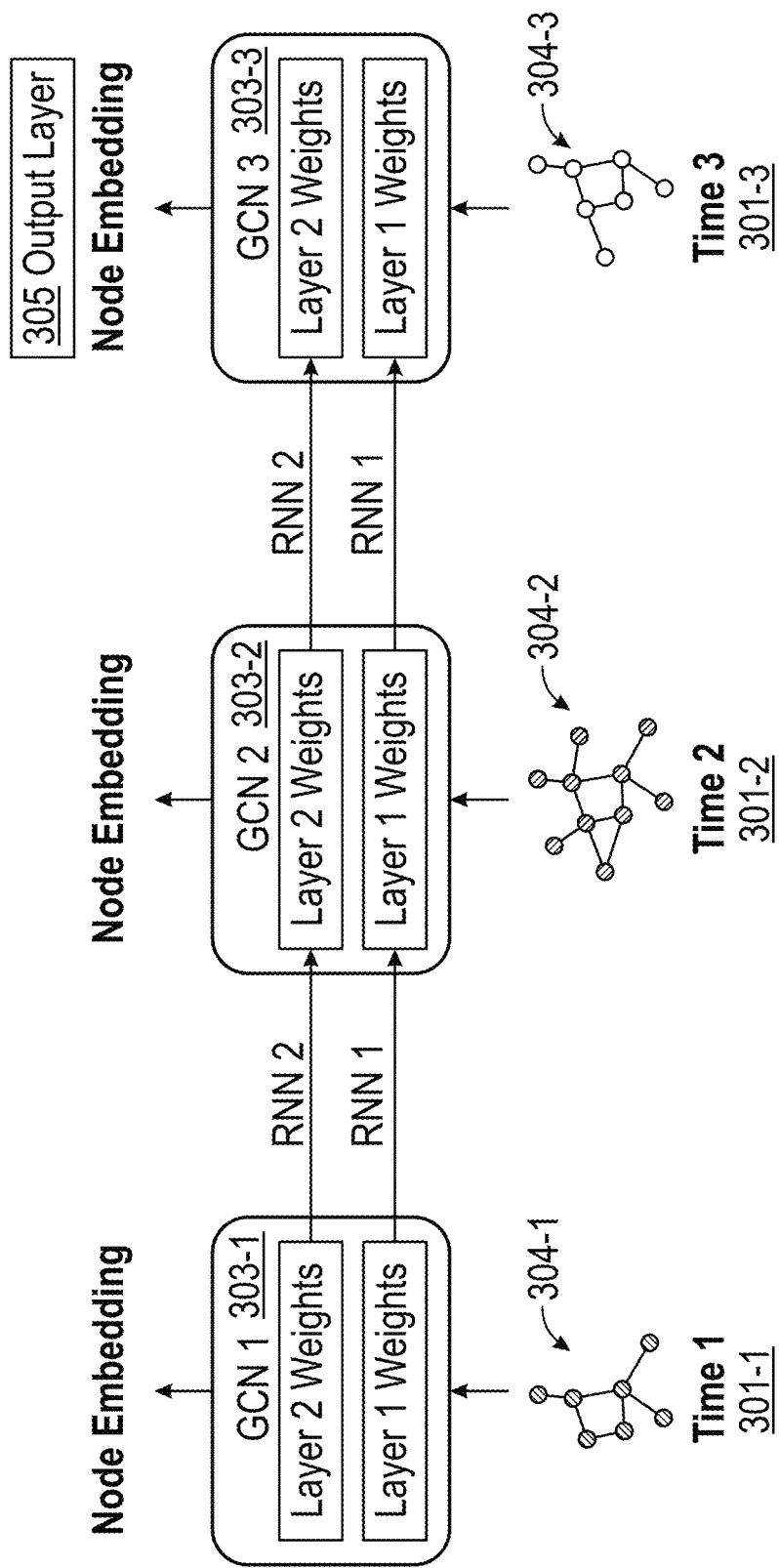
FIG. 3 shows a high-level view of an evolving graph convolutional network (GCN), according to an aspect of the invention.
Figure 4B:
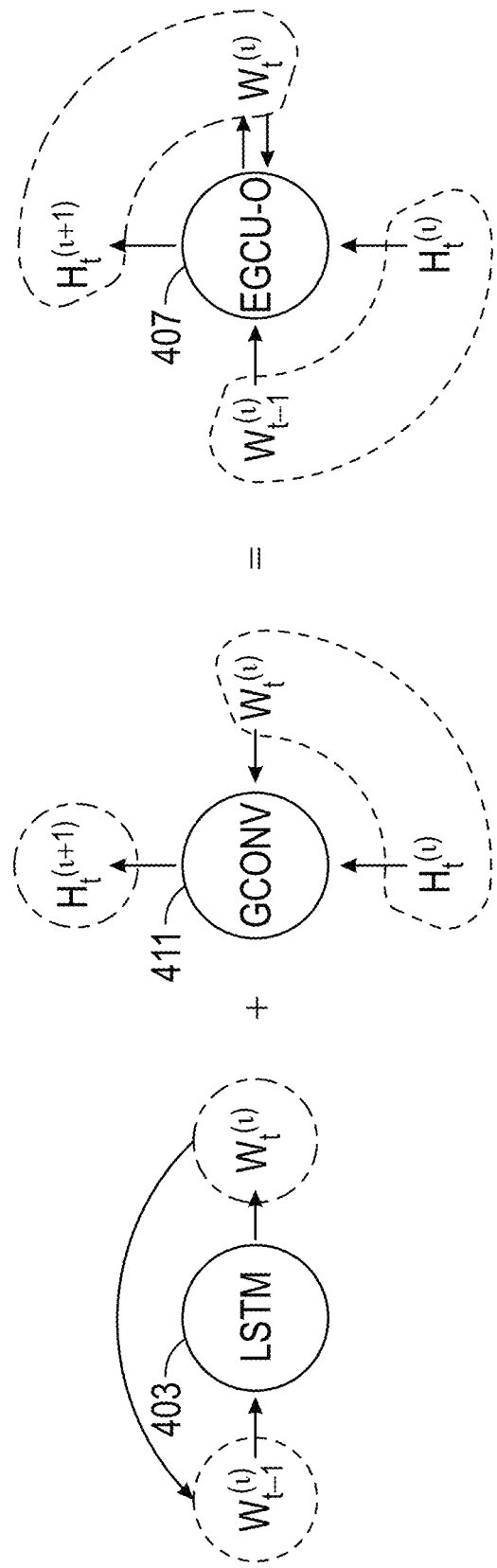

FIG. 3 is a schematic illustration of EvolveGCN, wherein each time step (e.g. Time 1 301-1, Time 2 301-2, and Time 3 301-3) contains one GCN (e.g. GCN 1 303-1, GCN 2 303-2, and GCN 3 303-3) indexed by time. The parameters of the GCN are the weight matrices $W_t^{(l)}$, for different time steps t and layers l. Graph convolutions occur for a particular time but generate new information along the layers. FIGS. 4A and 4B illustrate two possible non-limiting exemplary implementations of the computation at each layer. The relationship between $H_t^{(l)}$, $W_t^{(l)}$, and $H_t^{(l+1)}$ is depicted in the middle part of the figures. Referring back again to FIG. 3, the RNN means a recurrent architecture in general (e.g. GRU, LSTM). Thus, note Layer 1 weights and Layer 2 weights in each GCN, linked by RNN 1 and RNN 2, respectively. Note also the node embeddings output by each GCN FIGS. 4A and 4B show two options to evolve the GCN weights, treating them with different roles in the RNN. See the EvolveGCN-H version and EvolveGCN-O version in FIGS. 4A and 4B, respectively. In EvolveGCN-H in FIG. 4A, the GCN parameters are hidden states of a recurrent architecture that takes node embeddings as input. In EvolveGCN-O in FIG. 4B, the GCN parameters are input/outputs of a recurrent architecture. Block 305 in FIG. 3 is the output layer.

Weight Evolution: one pertinent aspect of one or more embodiments is the update of the weight matrix $W_t^{(l)}$ at time t based on current, as well as historical, information. This requirement can be naturally fulfilled by using a recurrent architecture, with two exemplary options.

The first exemplary option is to treat $W_t^{(l)}$ as the hidden state of the dynamical system. Use a gated recurrent unit (GRU) 401 to update the hidden state upon time-t input to the system. The input information naturally is the node embeddings $H_t^{(l)}$. Write:

$$\underbrace{W_t^{(l)}}_{\text{hidden state}} = GRU\left(\underbrace{H_t^{(l)}}_{\text{input}}, \underbrace{W_{t-1}^{(l)}}_{\text{hidden state}}\right)$$

wherein additional details are provided elsewhere herein. The GRU can be replaced by other recurrent architectures, as long as the roles of $W_t^{(l)}$, $H_t^{(l)}$, and $W_{t-1}^{(l)}$ are clear. Use "-H" to denote this version, as per the left-hand part of FIG. 4A.

The second exemplary option is to treat $W_t^{(l)}$ as the output of the dynamical system (which becomes the input at the subsequent time step). Use a long short-term memory (LSTM) cell 403 to model this input-output relationship. The LSTM itself maintains the system information by using a cell context, which acts like the hidden state of a GRU. In this version, node embeddings are not used at all. Write:

$$\underbrace{W_t^{(l)}}_{output} = LSTM(\underbrace{W_{t-1}^{(l)}}_{input})$$

wherein additional details are provided elsewhere herein. The LSTM may be replaced by other recurrent architecture as long as the roles of $W_t^{(l)}$ and $W_{t-1}^{(l)}$ are clear. Use "-O" to denote this version; see the left-hand part of FIG. 4B.

Evolving Graph Convolution Unit (EGCU): Combining the graph convolution unit GCONV 411 and the recurrent architecture presented above, the evolving graph convolution unit (EGCU) is introduced. Depending on the way that GCN weights are evolved, there are two versions as shown in FIG. 5. In the -H version 405, the GCN weights are treated as hidden states of the recurrent architecture; whereas in the -O version 407, these weights are treated as input/outputs. In both versions, the EGCU performs graph convolutions along layers and meanwhile evolves the weight matrices over time. Chaining the units bottom-up, obtain a GCN with multiple layers for one time step. Then, unrolling over time horizontally, the units form a lattice on which information ($H_t^{(l)}$, $W_t^{(l)}$) flows. The overall model is referred to as an evolving graph convolutional network (EvolveGCN).

Implementation of the -H version: the -H version can be implemented by using a standard GRU, with two extensions: (a) extending the inputs and hidden states from vectors to matrices (because the hidden state is now the GCN weight matrices); and (b) matching the column dimension of the input with that of the hidden state.

The matrix extension can be carried out by placing the column vectors side by side to form a matrix. In other words, use the same GRU to process each column of the GCN weight matrix. For completeness, write the matrix version of GRU in the following, by noting that all named variables (such as $X_t$ and $H_t$) are only local variables; they are not to be confused with the mathematical notations used thus far. These local variable names are used so that the GRU functionality can be easily recognized. Refer to FIG. 6.

The number of columns of the GRU input should match that of the hidden state. Let the latter number be k. Summarize all the node embedding vectors into k representative ones (each used as a column vector). The pseudocode of FIG. 7 gives one exemplary approach for this summarization. By convention, it takes a matrix $X_t$ with many rows as input and produces a matrix $Z_t$ with only k rows. The summarization employs a parameter vector p that is independent of the time index t (but may vary for different graph convolution layers). This vector is used to compute weights for the rows, among which the ones corresponding to the top k weights are selected and are weighted for output.

With the functions g and summarize from FIGS. 6 and 7, now completely specify the recurrent architecture:

$$W_t^{(l)} = GRU(H_t^{(l)}, W_{t-1}^{(l)})$$
$$:= g(\text{summarize}(H_t^{(l)}, \#col(W_{t-1}^{(l)}))^T, W_{t-1}^{(l)})$$

where #col denotes the number of columns of a matrix and the superscript T denotes matrix transpose. Effectively, it summarizes the node embedding matrix $H_t^{(l)}$ into one with appropriate dimensions and then evolves the weight matrix $W_{t-1}^{(l)}$ in the past time step to $W_t^{(l)}$ for the current time. Note again that the recurrent hidden state may be realized by not only GRU, but also other RNN architectures as well.

Implementation of the -O version: Implementing the -O version utilizes an extension of the standard LSTM from the vector version to the matrix version. FIG. 8 presents the pseudocode, where note again that all named variables are only local variables and they are not to be confused with the mathematical notations used thus far. These local variable names are used to permit easy recognition of the LSTM functionality.

With the function f from FIG. 8, now completely specify the recurrent architecture:

$$W_t^{(l)} = LSTM(W_{t-1}^{(l)}) := f(W_{t-1}^{(l)})$$

Note again that the recurrent input-output relationship may be realized by not only LSTM, but also other RNN architectures as well.

Experiments: A comprehensive set of experiments are presented to demonstrate the effectiveness of EvolveGCN. The setting includes a variety of data sets, tasks, compared methods, and evaluation metrics. Hyperparameters are tuned by using the validation set and test results are reported at the best validation epoch. It is to be understood that other embodiments might achieve different results.

A combination of synthetic and publicly available benchmark data sets were employed for experiments:

Stochastic Block Model (SBM for short) is a popularly used random graph model for simulating community structures and evolutions; synthetic data was generated from the model.

Bitcoin OTC (BC-OTC for short) is a who-trusts-whom network of bitcoin users. The data set may be used for predicting the polarity of each rating and forecasting whether a user will rate another one in the next time step.

Bitcoin Alpha (BC-Alpha for short) is created in the same manner as is BC-OTC, except that the users and ratings come from a different trading platform.

UC Irvine messages (UCI for short) is an online community of students from the University of California, Irvine, wherein the links of the social network indicate sent messages between users. Link prediction is a standard task for this data set.

Autonomous systems (AS for short) is a communication network of routers that exchange traffic flows with peers. This data set may be used to forecast message exchanges in the future.

Reddit Hyperlink Network (Reddit for short) is a subreddit-to-subreddit hyperlink network, where each hyperlink originates from a post in the source community and links to a post in the target community. The hyperlinks are annotated with sentiment. The data set may be used for sentiment classification.

Elliptic is a network of bitcoin transactions, wherein each node represents one transaction and the edges indicate payment flows. Approximately 20% of the transactions have been mapped to real entities belonging to legitimate categories versus inappropriate ones. The aim is to categorize the unlabeled transactions.

These data sets are summarized in the table of FIG. 9. Training/validation/test splits are done along the temporal dimension. The temporal granularity is case dependent but all available information of the data sets was used, except AS for which only the first one hundred days was used.

EvolveGCN supports, for example, three predictive tasks as elaborated below. The model for producing the embeddings and the predictive model are trained end to end. The output embedding of a node u by GCN at time t is denoted by $h_t^u$.

Link Prediction. The task of link prediction is to leverage information up to time t and predict the existence of an edge (u, v) at time t+1. Since historical information has been encoded in the GCN parameters, base the prediction on $h_t^u$ and $h_t^v$. To achieve so, concatenate these two vectors and apply an MLP to obtain the link probability. Perform negative sampling and optimize the cross-entropy loss function.

Five data sets are used for experimentation for this task. See the header of the table of FIG. 10. Evaluation metrics include mean average precision (MAP) and mean reciprocal rank (MRR).

Edge Classification. Predicting the label of an edge (u, v) at time t is done in almost the same manner as link prediction: concatenate $h_t^u$ and $h_t^v$ and apply an MLP to obtain the class probability.

Three data sets are used for experimentation for this task: BC-OTC, BC-Alpha, and Reddit. Evaluation metrics are precision, recall, and F1.

Node Classification. Predicting the label of a node u at time t follows the same practice of a standard GCN: the activation function of the last graph convolution layer is the softmax, so that $h_t^u$ is a probability vector. One data set (Elliptic) was used for demonstration. This data set is the largest one in node count in the table of FIG. 9. The evaluation metrics are the same as those for edge classification.

The two versions EvolveGCN-H and EvolveGCN-O were compared as part of the experiments, with the following four baselines (two supervised and two unsupervised):

GCN: without any temporal modeling—one single GCN model was used for all time steps and the loss was accumulated along the time axis.

GCN-GRU: this is also a single GCN model, but it is co-trained with a recurrent model (GRU) on node embeddings. This approach is referred to as GCN-GRU.

DynGEM: is an unsupervised node embedding approach, based on the use of graph autoencoders. The autoencoder parameters learned at the past time step are used to initialize the ones of the current time for faster learning.

dyngraph2vec: this method is also unsupervised; it has several variants, namely, dyngraph2vecAE, dyngraph2vecRNN, and dyngraph2vecAERNN. The first one is similar to DynGEM, but additionally incorporates the past node information for autoencoding. The others use RNN to maintain the past node information.

The data set Elliptic is equipped with computed node features; and Reddit contains computed feature vectors. For all other data sets, one-hot node-degree was used as the input feature. Following convention, GCN has two layers and MLP has one layer.

The embedding size of both GCN layers is set the same, to reduce the effort of hyperparameter tuning.

Results for Link Prediction: The MAP and MRR are reported in the table of FIG. 10. At least one version of EvolveGCN achieves the best result for each of the data sets SBM, UCI, and AS. For BC-OTC and BC-Alpha, EvolveGCN also outperforms the two GCN related baselines, but it is inferior to DynGEM and dyngraph2vec. These latter methods differ from others in that node embeddings are obtained in an unsupervised manner. It is surprising that unsupervised approaches are particularly good on certain data sets, given that the link prediction model is trained separately from graph autoencoding. In such a case, graph convolution does not seem to be sufficiently powerful in capturing the intrinsic similarity of the nodes, rendering a much inferior starting point for dynamic models to catch up. Although EvolveGCN substantially improves over GCN, in some instances it does not function quite as well as graph autoencoding.

Results for Edge Classification: The F1 scores across different methods are compared in FIG. 11, for the data sets BC-OTC, BC-Alpha, and Reddit. In all cases, the two EvolveGCN versions outperform GCN and GCN-GRU. Moreover, similar observations are made for the precision and the recall, which are omitted to avoid clutter. These appealing results corroborate the effectiveness of one or more embodiments.

Results for Node Classification: The F1 scores for the data set Elliptic are also plotted in FIG. 11. In this data set, the classes correspond to legitimate and inappropriate transactions respectively and they are highly skewed. For a financial misconduct forensic, the inappropriate class is the main interest. Hence, plot the F1 score for the inappropriate class. It can be seen that EvolveGCN-O performs better than the static GCN, but not so much as GCN-GRU. Indeed, dynamic models are more effective.

Figure 11:
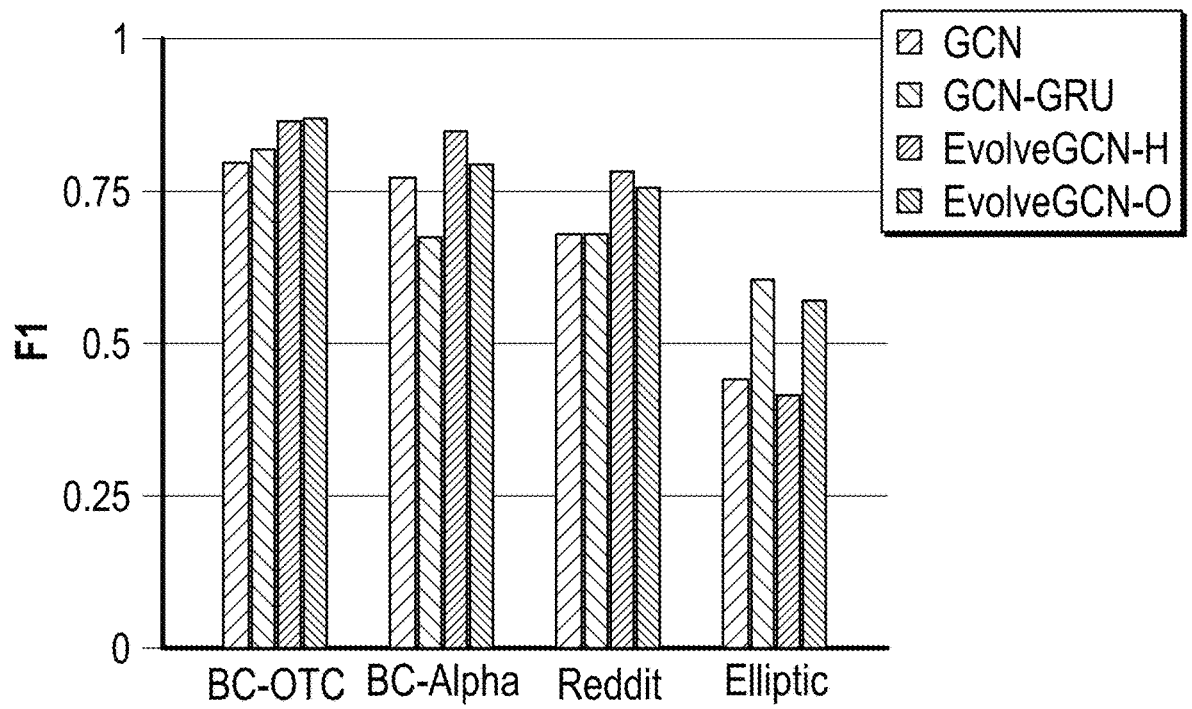
FIG. 11 shows exemplary experimental performance of edge classification and node classification obtained in testing experimental embodiments of the invention.

Thus, FIG. 11 shows performance for edge classification and node classification. For edge classification (BC-OTC, BC-Alpha, and Reddit), the F1 score is the micro average. For node classification (Elliptic), because of the exceedingly high class imbalance and strong interest in the inappropriate transactions, the F1 score for the inappropriate class is plotted instead.

Figure 12:
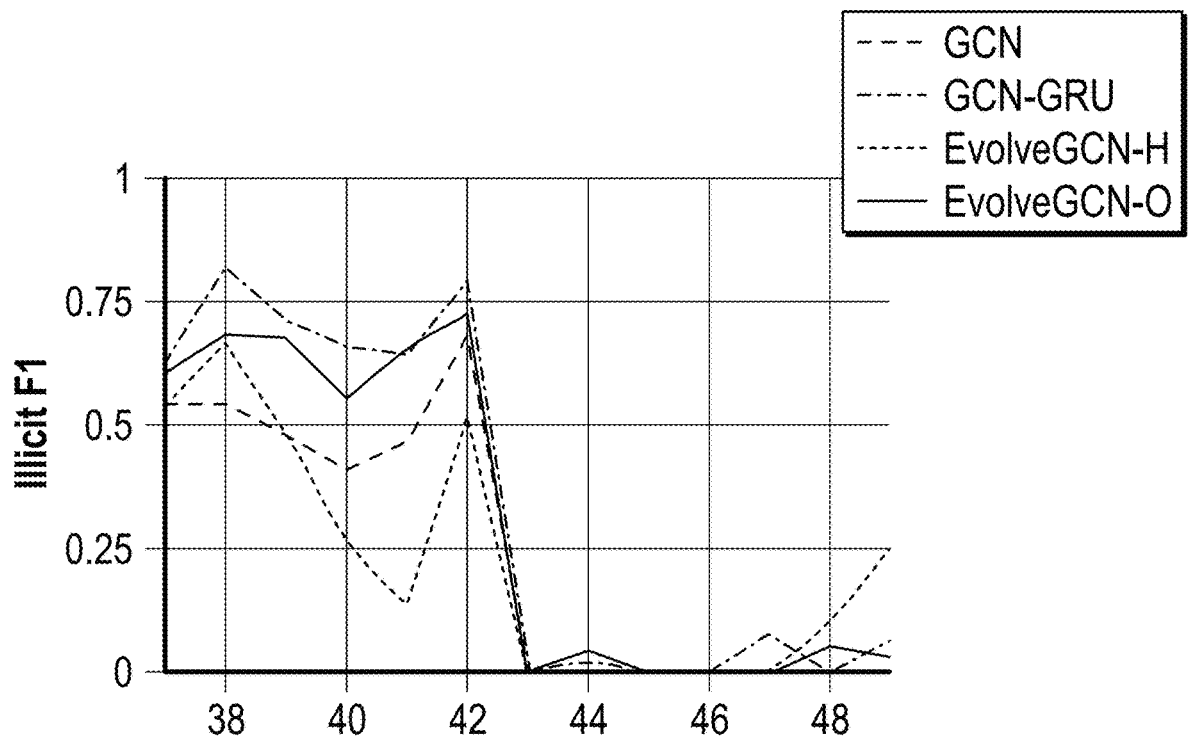
FIG. 12 is a graph showing exemplary experimental performance of node classification over time obtained in testing experimental embodiments of the invention.

FIG. 12 plots the history of the F1 scores along time (performance of node classification over time). The F1 score is for the inappropriate class. All methods perform poorly starting at step 43 on the horizontal axis. This time is when a shutdown of a portion of the worldwide web that appeals to individuals engaging in inappropriate activity occurred. Such an emerging event causes performance degrade for all methods, with non-dynamic models suffering the most. Even dynamic models are not able to perform reliably, because the emerging event has not been learned.

The effectiveness of neural network architectures for graph structured data has been widely confirmed. In practical scenarios, however, graphs are often constantly evolving, rather than being conveniently static for a once-for-all investigation. One or more embodiments advantageously provide neural networks that can handle such a dynamism, combining GNN with RNN. While prior art techniques have used the GNN as a feature extractor and use an RNN to learn the dynamics from the extracted node feature, one or more embodiments instead use the RNN to evolve the GNN, so that the dynamism is captured in the evolving network parameters. Advantageously, dynamic data is handled in a more flexible manner, because a node does not need to be present all the time. Experimental results confirm that one or more embodiments generally outperform related ones for a variety of tasks, including link prediction, edge classification, and node classification.

One or more embodiments use Graph Convolutional Networks to compute node vectors. One or more embodiments are not limited to knowledge graphs but can be applied to a general graph. One or more embodiments deal with a sequence of dynamically changing graphs, rather than being limited to static graphs. One or more embodiments handle graph structured data. One or more embodiments compute different parameter matrices in the Graph Convolutional Networks at different time steps. In one or more instances, the dynamics of the graphs are captured by using the Long Short-Term Memory networks based on the parameter matrices of the Graph Convolutional Networks; as a result, it is possible to handle the case when graph nodes appear and disappear over time.

Given the discussion thus far, it will be appreciated that, in general terms, an exemplary machine learning system, according to an aspect of the invention, includes a plurality of graph convolutional networks 303-1, 303-2, 303-3 corresponding to a plurality of time steps (e.g. Time 1 301-1, Time 2 301-2, and Time 3 301-3), Each graph convolutional network models a graph 304-1, 304-2, 304-3 including nodes and edges. In one or more embodiments, there is more than one GCN since the GCNs change over time—nodes and edges can appear and disappear over time as seen at 304-1, 304-2, 304-3. Each graph convolutional network includes a plurality of graph convolution units 411.

Also included are an evolving mechanism (e.g. 401, 403 as the case may be communicating with each GCN 411) and an output layer 305 (examples of which are provided elsewhere herein).

In one or more embodiments, the plurality of graph convolutional networks, the evolving mechanism, and the output layer are in data communication; for example, they can be different pieces of software code running on the same processor(s) that share data/data structures.

In one or more embodiments, each of the graph convolution units, for a given one of the time steps, takes as input a graph adjacency matrix A, a node feature matrix H, and a parameter matrix W for a current layer, and outputs a new node feature matrix $I^{(l+1)}$ for a next highest layer.

In one or more embodiments, the evolving mechanism takes as input a parameter matrix $W_{(t-1)}$ for a time step prior to the given one of the time steps, updates the input parameter matrix, and outputs the parameter matrix W for the given one of the time steps.

In one or more embodiments, the output layer obtains, as input, output of each of the graph convolution units for a final one of the time steps, and based on the output of each of the graph convolution units for the final one of the time steps, outputs a graph solution output. The graph solution output includes at least one of a node classification at a future time, an edge classification at a future time, a link prediction at a future time, and a graph classification at a future time (in some instances, an output selected from the group consisting of a node classification at a future time, an edge classification at a future time, a link prediction at a future time, and a graph classification at a future time).

In one or more embodiments, the evolving mechanism handles node appearance and disappearance. Please refer to addition and subtraction of graph nodes at 304-1, 304-2, and 304-3.

In one or more embodiments, the evolving mechanism includes a recurrent neural network (e.g., GRU 401 of –H version) which further takes as input the node feature matrix for the given one of the time steps and the current layer and wherein weights of the parameter matrix are treated as hidden states of the recurrent neural network (also referred to herein as "recurrent architecture").

In one or more embodiments, the evolving mechanism includes a long short-term memory (LSTM) cell (e.g., 403 of O– version) and weights of the parameter matrix are treated as inputs and outputs of the long short-term memory (LSTM) cell.

In some instances, the output layer is formed by a last one of the graph convolution units and outputs the node classification at the future time as a probability vector for each graph node at a specific time step corresponding to the future time. In some such instances, the graphs modelled by the graph convolutional networks include financial transaction graphs, with the nodes corresponding to customer accounts and the edges corresponding to transactions between the accounts, and the node classification identifies ones of the accounts engaging in inappropriate ones of the transactions. In other such instances, the graphs modelled by the graph convolutional networks include malware detection graphs for a computer network, with the nodes corresponding to computers of the network and the edges corresponding to communications between the computers (see, e.g., FIG. 1), and the node classification identifies ones of the nodes corresponding to ones of the computers engaging in misbehavior. Thus, for malware detection, this use case can be handled by node classification. Nodes of the graph represent computers and edges of the graph present communication between computers. Such embodiments classify suspicious nodes (computers that misappropriate information, or demand ransom, from other computers).

In some instances, the output layer outputs the edge classification at the future time by concatenating features of two incident nodes associated with the edge, and applying a multilayer perceptron to output a probability vector for the edge. In some such instances, the graphs modelled by the graph convolutional networks include financial transaction graphs with the nodes corresponding to customer accounts and the edges corresponding to transactions between the accounts, and the edge classification identifies inappropriate ones of the transactions. In other such instances, the graphs modelled by the graph convolutional networks include computer network intrusion detection graphs with the nodes corresponding to computers and the edges corresponding to communications between the computers (see, e.g., FIG. 1), and the edge classification identifies suspicious ones of the edges corresponding to attempted unauthorized intrusions into the network. Thus, for intrusion detection, this use case can be handled by edge classification. Nodes of the graph represent computers and edges of the graph represent communication between computers. Such embodiments classify suspicious edges.

In some instances, the output layer outputs the link prediction at the future time by concatenating features of two incident nodes associated with the link, and applying a multilayer perceptron to output a probability for the link. In some such cases, the graphs modelled by the graph convolutional networks include recommendation graphs with the nodes corresponding to buyers and merchandise and the edges corresponding to purchase records, and the edge classification forecasts future purchases.

In some instances, the output layer outputs the graph classification at the future time by aggregating all node features of a last one of the graph convolution units, and applying a multilayer perceptron to output a graph probability vector.

In another aspect, an exemplary method includes the step of, for each of a plurality of graph convolutional networks 303-1, 303-2, 303-3, corresponding to a plurality of time steps 301-1, 301-2, 301-3, each graph convolutional network modelling a graph 304-1, 304-2, 304-3 including nodes and edges, each graph convolutional network including a plurality of graph convolution units 411, for a given one of the time steps, taking as input a graph adjacency matrix, a node feature matrix, and a parameter matrix for a current layer, and outputting a new node feature matrix for a next highest layer. Further steps include, with an evolving mechanism 401, 403, taking as input a parameter matrix for a time step prior to the given one of the time steps, updating the input parameter matrix, and outputting the parameter matrix for the given one of the time steps; and obtaining, as input to an output layer 305 in data communication with the evolving mechanism and the plurality of graph convolutional networks, output of each of the graph convolution units for a final one of the time steps, and based on the output of each of the graph convolution units for the final one of the time steps, outputting from the output layer a graph solution output as discussed above.

The method can further include any of the steps described herein as performed by the system; for example, the method can further include handling node appearance and disappearance with the evolving mechanism. In some cases, the evolving mechanism includes a recurrent neural network, and the method further includes, with the recurrent neural network, taking as input the node feature matrix for the given one of the time steps and the current layer and treating weights of the parameter matrix as hidden states of the recurrent neural network. In some cases, the evolving mechanism includes a long short-term memory (LSTM) cell, and the method further includes treating weights of the parameter matrix as inputs and outputs of the long short-term memory (LSTM) cell.

Figure 13:
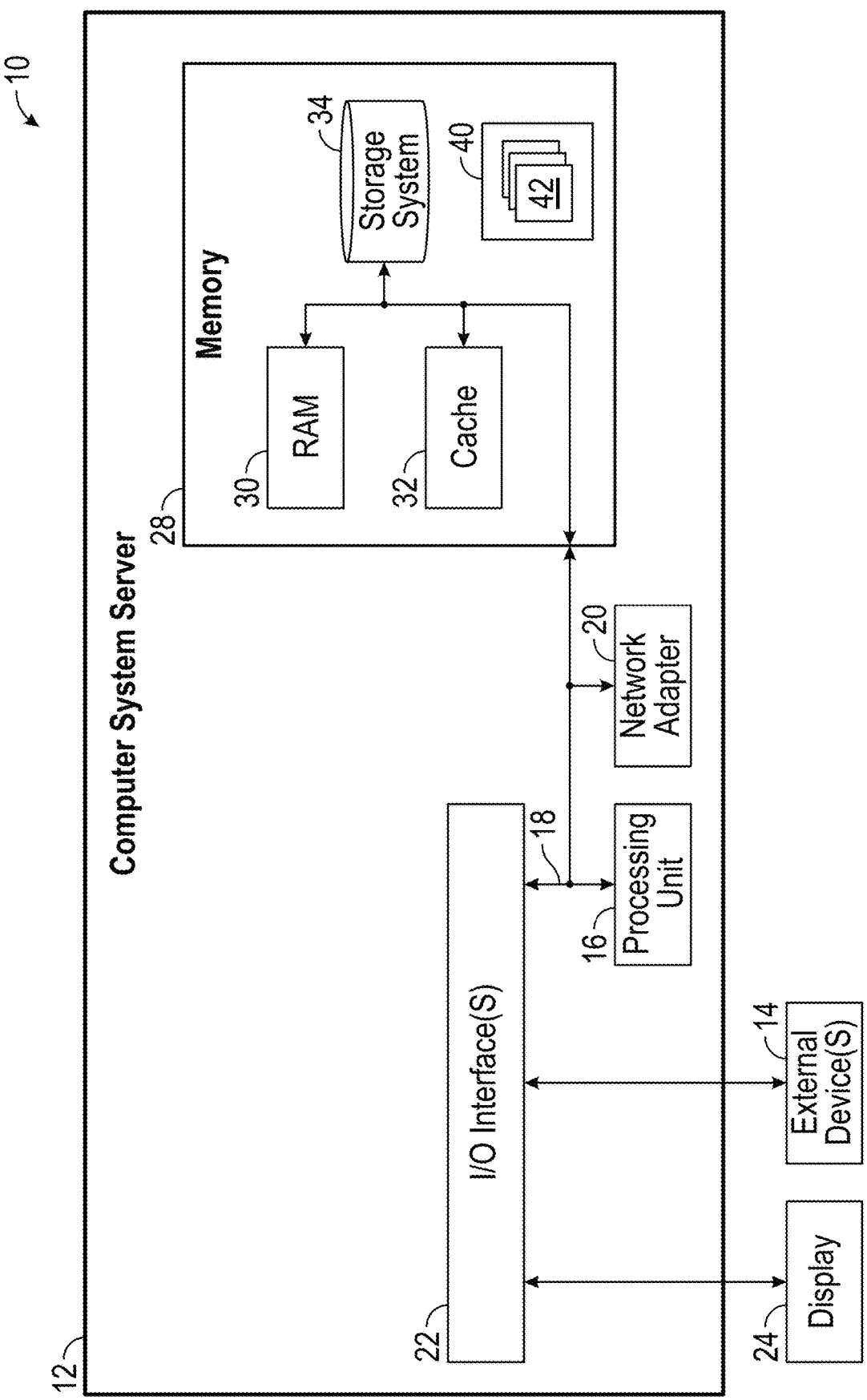
FIG. 13 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 13 depicts a computer system that may be useful in implementing one or more aspects and/or elements of the invention, also representative of a cloud computing node according to an embodiment of the present invention. Referring now to FIG. 13, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (IO) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 13, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 13) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for capturing the global structure of logical formulae with graph long short-term memory.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A machine learning system comprising:
  a plurality of graph convolutional networks corresponding to a plurality of time steps, each graph convolutional network modelling a graph including nodes and edges, each graph convolutional network comprising a plurality of graph convolution units;
  an evolving mechanism; and
  an output layer;
  wherein:
    said plurality of graph convolutional networks, said evolving mechanism, and said output layer are in data communication;
    each of said graph convolution units, for a given one of said time steps,
    takes as input a graph adjacency matrix, a node feature matrix, and a parameter matrix for a current layer, and outputs a new node feature matrix for a next highest layer;

said evolving mechanism takes as input a parameter matrix for a time step prior to said given one of said time steps, updates said input parameter matrix, and outputs said parameter matrix for said given one of said time steps; and said output layer obtains, as input, output of each of said graph convolution units for a final one of said time steps, and based on said output of each of said graph convolution units for said final one of said time steps, outputs a graph solution output.

2. The method of claim 1, wherein said graph solution output comprises an output selected from the group consisting of a node classification at a future time, an edge classification at a future time, a link prediction at a future time, and a graph classification at a future time.

3. The system of claim 2, wherein said evolving mechanism handles node appearance and disappearance.

4. The system of claim 3, wherein said evolving mechanism comprises a recurrent neural network which further takes as input said node feature matrix for said given one of said time steps and said current layer and wherein weights of said parameter matrix are treated as hidden states of said recurrent neural network.

5. The system of claim 3, wherein said evolving mechanism comprises a long short-term memory (LSTM) cell and wherein weights of said parameter matrix are treated as inputs and outputs of said long short-term memory (LSTM) cell.

6. The system of claim 3, wherein said output layer is formed by a last one of said graph convolution units and outputs said node classification at said future time as a probability vector for each graph node at a specific time step corresponding to said future time.

7. The system of claim 6, wherein said graphs modelled by said graph convolutional networks comprise financial transaction graphs, with said nodes corresponding to customer accounts and said edges corresponding to transactions between said accounts, and wherein said node classification identifies ones of said accounts engaging in inappropriate ones of said transactions.

8. The system of claim 6, wherein said graphs modelled by said graph convolutional networks comprise malware detection graphs for a computer network, with said nodes corresponding to computers of said network and said edges corresponding to communications between said computers, and wherein said node classification identifies ones of said nodes corresponding to ones of said computers engaging in misbehavior.

9. The system of claim 3, wherein said output layer outputs said edge classification at said future time by concatenating features of two incident nodes associated with said edge, and applying a multilayer perceptron to output a probability vector for said edge.

10. The system of claim 9, wherein said graphs modelled by said graph convolutional networks comprise financial transaction graphs with said nodes corresponding to customer accounts and said edges corresponding to transactions between said accounts, and wherein said edge classification identifies inappropriate ones of said transactions.

11. The system of claim 9, wherein said graphs modelled by said graph convolutional networks comprise computer network intrusion detection graphs with said nodes corresponding to computers and said edges corresponding to communications between said computers, and wherein said edge classification identifies suspicious ones of said edges corresponding to attempted unauthorized intrusions into said network.

12. The system of claim 3 wherein said output layer outputs said link prediction at said future time by concatenating features of two incident nodes associated with said link, and applying a multilayer perceptron to output a probability for said link.

13. The system of claim 12, wherein said graphs modelled by said graph convolutional networks comprise recommendation graphs with said nodes corresponding to buyers and merchandise and said edges corresponding to purchase records, and wherein said edge classification forecasts future purchases.

14. The system of claim 3, wherein said output layer outputs said graph classification at said future time by aggregating all node features of a last one of said graph convolution units, and applying a multilayer perceptron to output a graph probability vector.

15. A non-transitory computer readable medium comprising computer executable instructions which when executed by a computer cause the computer to perform the method of:

for each of a plurality of graph convolutional networks corresponding to a plurality of time steps, each graph convolutional network modelling a graph including nodes and edges, each graph convolutional network comprising a plurality of graph convolution units, for a given one of said time steps, taking as input a graph adjacency matrix, a node feature matrix, and a parameter matrix for a current layer, and outputting a new node feature matrix for a next highest layer;

with an evolving mechanism, taking as input a parameter matrix for a time step prior to said given one of said time steps, updating said input parameter matrix, and outputting said parameter matrix for said given one of said time steps; and obtaining, as input to an output layer in data communication with said evolving mechanism and said plurality of graph convolutional networks, output of each of said graph convolution units for a final one of said time steps, and based on said output of each of said graph convolution units for said final one of said time steps, outputting from said output layer a graph solution output.

16. The non-transitory computer readable medium of claim 15, wherein said graph solution output comprises an output selected from the group consisting of a node classification at a future time, an edge classification at a future time, a link prediction at a future time, and a graph classification at a future time.

17. The non-transitory computer readable medium of claim 16, wherein said evolving mechanism comprises a recurrent neural network, wherein said method further comprises, with said recurrent neural network, taking as input said node feature matrix for said given one of said time steps and said current layer and treating weights of said parameter matrix as hidden states of said recurrent neural network.

18. The non-transitory computer readable medium of claim 16, wherein said evolving mechanism comprises a long short-term memory (LSTM) cell, wherein said method further comprises treating weights of said parameter matrix as inputs and outputs of said long short-term memory (LSTM) cell.

19. A method comprising:

for each of a plurality of graph convolutional networks corresponding to a plurality of time steps, each graph convolutional network modelling a graph including nodes and edges, each graph convolutional network comprising a plurality of graph convolution units, for a given one of said time steps, taking as input a graph adjacency matrix, a node feature matrix, and a parameter matrix for a current layer, and outputting a new node feature matrix for a next highest layer;

with an evolving mechanism, taking as input a parameter matrix for a time step prior to said given one of said time steps, updating said input parameter matrix, and outputting said parameter matrix for said given one of said time steps; and obtaining, as input to an output layer in data communication with said evolving mechanism and said plurality of graph convolutional networks, output of each of said graph convolution units for a final one of said time steps, and based on said output of each of said graph convolution units for said final one of said time steps, outputting from said output layer a graph solution output.

20. The method of claim 19, wherein said graph solution output comprises an output selected from the group consisting of a node classification at a future time, an edge classification at a future time, a link prediction at a future time, and a graph classification at a future time.

* * * * *